United States Patent [19]

Kuan et al.

[11] Patent Number: 4,765,090
[45] Date of Patent: * Aug. 23, 1988

[54] SELF-SUPPORTED MOSQUITO INCENSE

[76] Inventors: Chin-Sheng Kuan; Chin-Mann Liao, both of P.O. Box 10160, Taipei, Taiwan

[*] Notice: The portion of the term of this patent subsequent to Aug. 23, 2004 has been disclaimed.

[21] Appl. No.: 854,417

[22] Filed: Apr. 21, 1986

[51] Int. Cl.$^4$ ............................................. A01M 13/00
[52] U.S. Cl. ..................................................... 43/127
[58] Field of Search ........................ 43/125, 127, 129; D22/120; D11/131.1; D23/366, 367, 368; 422/239

[56] References Cited

U.S. PATENT DOCUMENTS 3,795,999 3/1974 Tabita .................................... 43/127
4,126,958 11/1978 Yokoyama ........................... 43/127

Primary Examiner—M. Jordan

[57] ABSTRACT

A self-supported mosquito incense coil is formed with a plurality of lower extensions on the bottom surface of the incense coil and a plurality of upper recess portions on the upper surface of the coil wherein each lower extension is projectively corresponding to each upper recess portion, so that each upper coil can be overlapped on each lower coil for its handling or storage, and each coil can stably stand on any place or dish for smooth burning without the aid of any teeth-supported ash tray.

3 Claims, 2 Drawing Sheets

SELF-SUPPORTED MOSQUITO INCENSE

BACKGROUND OF THE INVENTION

Conventional mosquito incense, as shown in FIG. 1, is made from mosquitocide, combustible material and filler to form a spiral shape incense, which can be fumigated to kill or repel the mosquitoes, but having the following defects:

1. In a box for available in the market for storing plural pieces of coil incense C, there is only provided with one ash tray T so that after long time burning, the residual tar may contaminate the tray T to even render the ash tray unusable.

2. When burning the incense coil till the innermost tail portion, the tail portion may not be stably supported by the teeth of the tray T and will be collapsed to extinguish its burning so as to waste the incense.

3. Once the incense coil being broken during its handling or use, the broken sections will no longer be held on the teeth and may be disposed to waste the incense.

The present inventors have found the defects of conventional mosquito incense and its tray, and invented the present self-supported mosquito incense.

SUMMARY OF THE INVENTION

The object of the present invention is to provide a self-supported mosquito incense which is formed with a plurality of recess portions on the upper surface of the incense coil and a plurality of supporting extensions protruding under the incense coil so that the incense coil can stand on any place or dish for smooth burning without being supported by a teeth-forming ash tray.

Another object of the present invention is to provide a mosquito incense, of which the innermost tail portion is formed with a pair of coil-shaped parallel grooves on the upper surface of the incense and a pair of coiled-shaped parallel extensions under the incense, so that the tail portion, as supported by the pair of extensions for better ventilation of combustion air, will be completely burned out to prevent wasting of unburned incense.

Still another object of the present invention is to provide a mosquito incense which is formed with a pair of coil-shaped parallel extensions under the incense so that even the incense coil being broken into pieces, the broken section of incense may be self-supported by its own extensions protruding thereunder for smooth burning without being extinguished during its burning.

DETAILED DESCRIPTION

Figure 1:
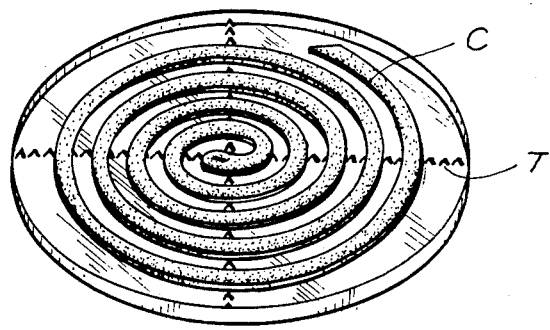
FIG. 1 is an illustration showing the conventional mosquito incense as supported on a ash tray.
Figure 2:
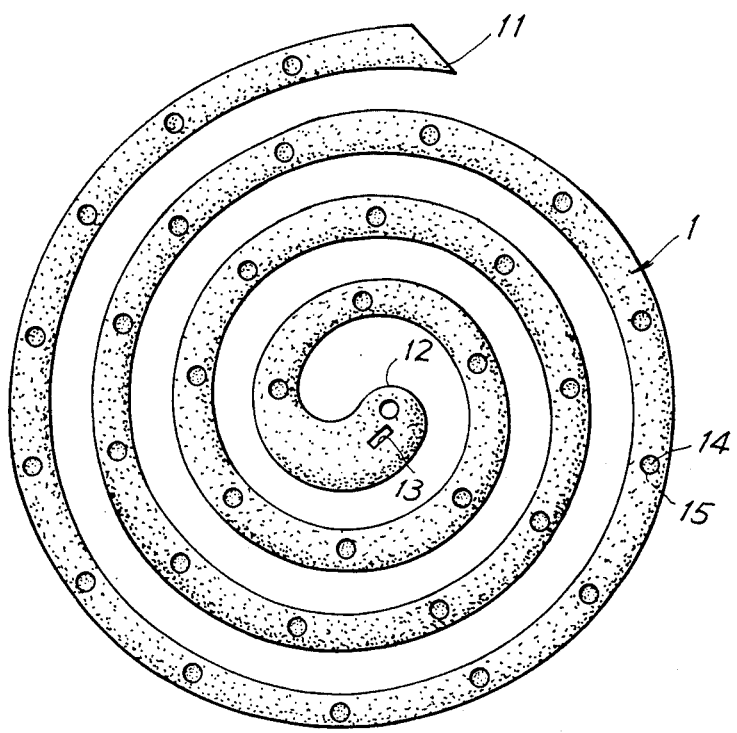
FIG. 2 is a top view of the present invention.
Figure 3:
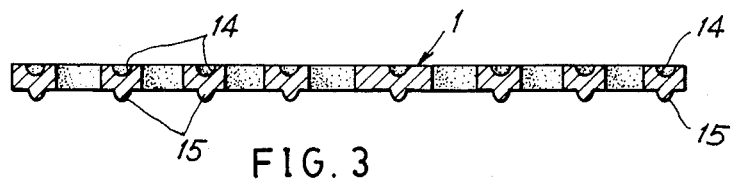
FIG. 3 is a sectional drawing of the present invention.

As shown in FIGS. 2 and 3, the present invention comprises a mosquito incense 1 formed as a coil or spiral shape having outermost tip 11, innermost tail 12 and a central hole 13 for the insertion of a supporting rod (not shown).

The incense coil 1 is formed with a plurality of recess portion 14 on the upper surface of the incense coil and a plurality of supporting extensions 15 under the incense coil 1, each extension 15 projectively corresponding to each recess portion 14. The upper coil 1 can be overlapped on the lower coil 1 by engaging those lower extension 15 with the upper recess portions 14 for volume-reduced packing or storage of the incense coils. All the extensions 15 and recess portions 14 are evenly formed on either the upper surface or the bottom surface of the incense coil.

Figure 3A:
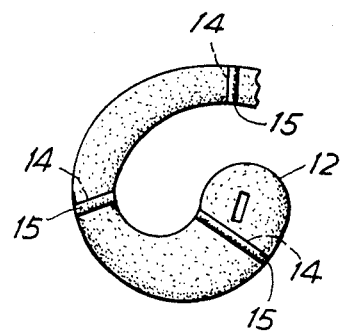
FIG. 3A shows one shape of the extension or recess portion of the present invention.

The shape of each extension 15 or recess portion may be formed as semi-spherical shape as shown in FIGS. 2, 3 or transverse rectangular shape as shown in FIG. 3A.

Figure 4:
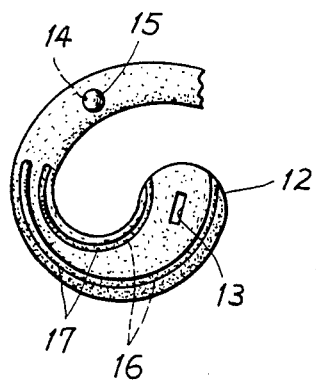
FIG. 4 is a partial illustration of the incense tail of another preferred embodiment of the present invention.
Figure 5:
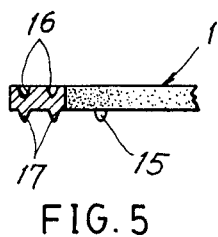
FIG. 5 is a sectional drawing of the present invention as shown in FIG. 4.

Another preferred embodiment of the present invention is shown in FIGS. 4 and 5, wherein the tail portion 12 of the incense coil 1 is formed with a pair of coil-shaped parallel grooves 16 on the upper surface of the incense coil and formed with a pair of coil-shaped parallel extensions 17 on the bottom surface of the incense coil, each lower extension 17 being projectively corresponding to each upper groove 16. By the way, the tail portion 12 may be well supported by its own extensions 17 and completely burned out without being collapsed to cause its self-extinguishment.

The present invention can be made to form a pair of coil-shaped parallel extensions 17 on the bottom surface of incense coil 1 along all the windings of the incense coil 1. A pair of coil-shaped parallel grooves 16 projectively corresponding to the pair of parallel extensions 17 are formed on the upper surface of the incense coil 1. This still preferred embodiment may substitute the coil 1 having upper recess portions 14 and lower extensions 15 as shown in FIGS. 2 and 3. By reviewing the transverse section of the coil 1 as shown in FIG. 5, every portion of coil 1 may stably stand on any place or dish without being collapsed and may be completely burned out in use.

What is claimed is:

1. A self-supported mosquito incense comprising an incense coil or spiral formed with a plurality of recess portions on the upper surface of said incense coil and a plurality of supporting extensions on the bottom surface thereof, each said lower supporting extensions projectively corresponding to each said upper recess portion, all said recess portions and said extensions being evenly formed on either the upper surface or the bottom surface of said incense coil.

2. A self-supported mosquito incense according to claim 1, wherein the tail portion of said incense coil is formed with a pair of coil-shaped parallel grooves on the upper surface of said incense coil and formed with a pair of coil-shaped parallel extensions on the bottom surface thereof, each said pair of lower extensions projectively corresponding to said pair of upper grooves.

3. A self-supported mosquito incense comprising an incense coil formed with a pair of coil-shaped parallel grooves on the upper surface of said incense coil and a pair of coil-shaped parallel extensions on the bottom surface thereof, each said pair of lower extensions projectively corresponding to said pair of upper grooves, either said pair of grooves or extensions being continuously formed on all windings of said incense coil from its outermost tip till the innermost tail portion.

* * * * *